United States Patent [19]

Fowler, III

[11] 4,408,191
[45] Oct. 4, 1983

[54] KEY CYCLE TIMER CONTROL PROVIDING A UNIVERSAL KEYBOARD

[75] Inventor: David M. Fowler, III, West Jordan, Utah

[73] Assignee: Sperry Corporation, New York, N.Y.

[21] Appl. No.: 334,276

[22] Filed: Dec. 24, 1981

Related U.S. Application Data

[63] Continuation of Ser. No. 102,698, Dec. 12, 1979, abandoned, which is a continuation-in-part of Ser. No. 908,346, May 22, 1978, abandoned.

[51] Int. Cl.$^3$ .............................................. G06F 3/02
[52] U.S. Cl. ............................ 340/365 R; 340/365 S; 364/200
[58] Field of Search ............ 340/365 E, 365 S, 365 R, 340/711, 712, 365 VL; 178/17 A, 17 C; 307/247 R, 247 A; 179/90 K; 400/477, 479, 368; 315/377; 364/200 MS File, 900 MS File

[56] References Cited

U.S. PATENT DOCUMENTS

| | | | |
|---|---|---|---|
| 3,808,363 | 4/1974 | Kieffer | 340/365 R |
| 4,020,391 | 4/1977 | Baxter | 340/365 S |
| 4,024,534 | 5/1977 | DuVall | 340/365 S |
| 4,106,011 | 8/1978 | Melanson et al. | 340/365 S |
| 4,241,333 | 12/1980 | Giebler et al. | 340/365 S |
| 4,263,582 | 4/1981 | Dumbovic | 340/365 S |

OTHER PUBLICATIONS

*Components Report XII*, "Integrated Circuits", No. 2, 1977, p. 54.

*Primary Examiner*—James J. Groody
*Attorney, Agent, or Firm*—Kenneth T. Grace; Marshall M. Truex

[57] ABSTRACT

A keyboard, having a plurality of actuatable key switches and an encoder responsive to actuation of each of the key switches for generating a character associated with each actuated key switch, includes a cycle time controller for making all of the characters potentially cycleable. The keyboard encoder, in addition to generating a character, will also generate a KEY SWITCH ACTUATED signal upon actuation of any one of the key switches and until the key switch is deactuated. The cycle timer controller responds to the generation of the KEY SWITCH ACTUATED signal and generates, after the lapse of a predetermined period of time from when the key switch was initially actuated and while the KEY SWITCH ACTUATED signal is still being generated, a CYCLE CHARACTER signal which may be used by a programmable terminal to cause cycling of the character generated by the decoder upon actuation of the key switch. If actuation of a first key switch is followed by actuation of a second key switch, then upon occurrence of the latter the cycle timer controller will be reinitialized and generate the CYCLE CHARACTER signal after the lapse of the predetermined time period from when the second key switch was actuated and while it remains actuated.

3 Claims, 5 Drawing Figures

FUNCTION TABLE

| INTER-VAL | KEY SWITCHES | | KEY SWITCH ACTUATED SIGNAL | ONE-SHOT (B=H; A=L) | | FLIP-FLOP (D=H; S=H) | | |
|---|---|---|---|---|---|---|---|---|
| | FIRST | SECOND | | CLR | $\bar{Q}$ | CLK | CLR | Q |
| (1) | DEACTUATED STATE | DEACTUATED STATE | L | L | H | H | L | L |
| (2) | ACTUATED | DEACTUATED STATE | L→H | L→H (TRIGGER) | H→L | H→L | L→H | L |
| (3) | ACTUATED STATE | DEACTUATED STATE | H | H | L | L | H | L |
| (4) | ACTUATED STATE | ACTUATED | H→L | H→L | L→H | L→H | H→L | L |
| (5) | ACTUATED STATE | ACTUATED STATE | L FOR 50 NANOSEC. | L | H | H | L | L |
| (6) | ACTUATED STATE | ACTUATED STATE | L→H | L→H (RETRIGGER) | H→L | H→L | L→H | L |
| (7) | DEACTUATED | ACTUATED STATE | H | H | L FOR 500 MILLISEC. | L | H | L |
| (8) | DEACTUATED STATE | ACTUATED STATE | H | H | L→H | L→H | H | L→H |
| (9) | DEACTUATED STATE | ACTUATED STATE | H | H | H | H | H | H |
| (10) | DEACTUATED STATE | DEACTUATED | H→L | H→L | H | H | H→L | H→L |
| (11) | DEACTUATED STATE | DEACTUATED STATE | L | L | H | H | L | L |

FIG. 4

KEY CYCLE TIMER CONTROL PROVIDING A UNIVERSAL KEYBOARD

This is a continuation of patent application filed Dec. 12, 1979 having Ser. No. 102,698, now abandoned, which was a continuation-in-part application of patent application filed May 22, 1978 having Ser. No. 908,346, now abandoned.

BACKGROUND OF THE INVENTION

1. Field of the Invention

The present invention broadly relates to a keyboard for use with a programmable, i.e., microprocessor-based, terminal and, more particularly, is concerned with the incorporation of a cycle timer controller in the keyboard for making every key switch on the keyboard cyclable and thereby provide a universal or general-purpose keyboard useable with any programmable terminal.

2. Description of the Prior Art

Character cycling during the performance of keystroking operations on a terminal keyboard is an essential tool for efficient use of the terminal and, therefore, is provided in virtually all terminals on the market today. Some examples of its use are to move the cursor across the terminal display screen, underline data and to delete characters of data in a particular line. All of these steps can be accomplished quickly and with a negligible expenditure of effort through character cycling.

Prior art keyboard design practices for providing character cycling capability have basically taken two approaches. First, the keyboard is provided with a separate "cycle" key switch that has to be depressed along with the particular other key switch which the operator intends to cycle. Second, a specific keyboard is designed to make certain of the key switches cyclable. Also, the rate at which the character is cycled upon depression of a particular one of the cyclable key switches is controlled by the keyboard. Thus, each time one desires a different selection of cyclable key switches and a different cycle rate on a keyboard for some other terminal, the keyboard has to be redesigned.

The disadvantages underlying both of these prior art approaches are readily apparent. With respect to the first approach, the necessity of having to depress two key switches at the same time and hold them both down in order to cycle the character of one is particularly inconvenient and distracting for the terminal operator. On the other hand, with the second approach the need to redesign the keyboard in order to provide for a different selection of cyclable key switches with a different cycle rate is wasteful in terms of the design and production time required to make and implement the redesign.

SUMMARY OF THE INVENTION

The disadvantages associated with the aforementioned prior art approaches for providing character cycling are obviated by the present invention when its principles are applied to keyboards to be used in conjunction with programmable terminals. The purpose of the present invention is to improve the keyboard so as to make it completely versatile in that it will be capable of use with any programmable terminal. This purpose is achieved by making all of the keyboard key switches (or at least those key switches which would potentially be used for character cycling) capable of turning on or raising a cycle signal and then leaving it to the particular terminal receiving the signal from the keyboard to decide (in accordance with its stored microcode) whether the particular key switch depressed will actually cycle or not and at what cycle rate.

In accordance with the present invention, all of the key switches are made potentially cyclable by incorporation of a cycle timer controller in the keyboard. The controller may be comprised of a one-shot monostable multivibrator and a flip-flop or of any other suitably functioning conventional electronic timer components. The controller does not control the rate at which the data character will be displayed on the terminal screen, but only determines whether a key switch has been held in a depressed position long enough to initiate a character cycling operation by the microcode storage of the terminal. Furthermore, the microcode of the terminal includes a recycle code that determines whether or not a particular key switch is actually cyclable.

From the point of view of the keyboard, virtually all of the key switches are cyclable, but whether or not this capability is utilized in the case of all of the key switches depends upon the particular terminal used with the keyboard. Also, the display or character cycling rate on the terminal screen is determined solely by the terminal. By the simple, but unique, technique of making all of the key switches of the keyboard potentially cyclable through incorporation of a cycle timer controller in the keyboard, which cycle timer controller will generate a cycle character signal after the lapse of a predetermined time from when a key switch is initially depressed and held there, a universal or general-purpose keyboard is provided. This keyboard may be used with any of a variety of differently-programmed terminals.

BRIEF DESCRIPTION OF THE DRAWINGS

FIG. 4 sets forth a function table which corresponds to the operations depicted in FIG. 3.

DETAILED DESCRIPTION OF THE INVENTION

Figure 1:
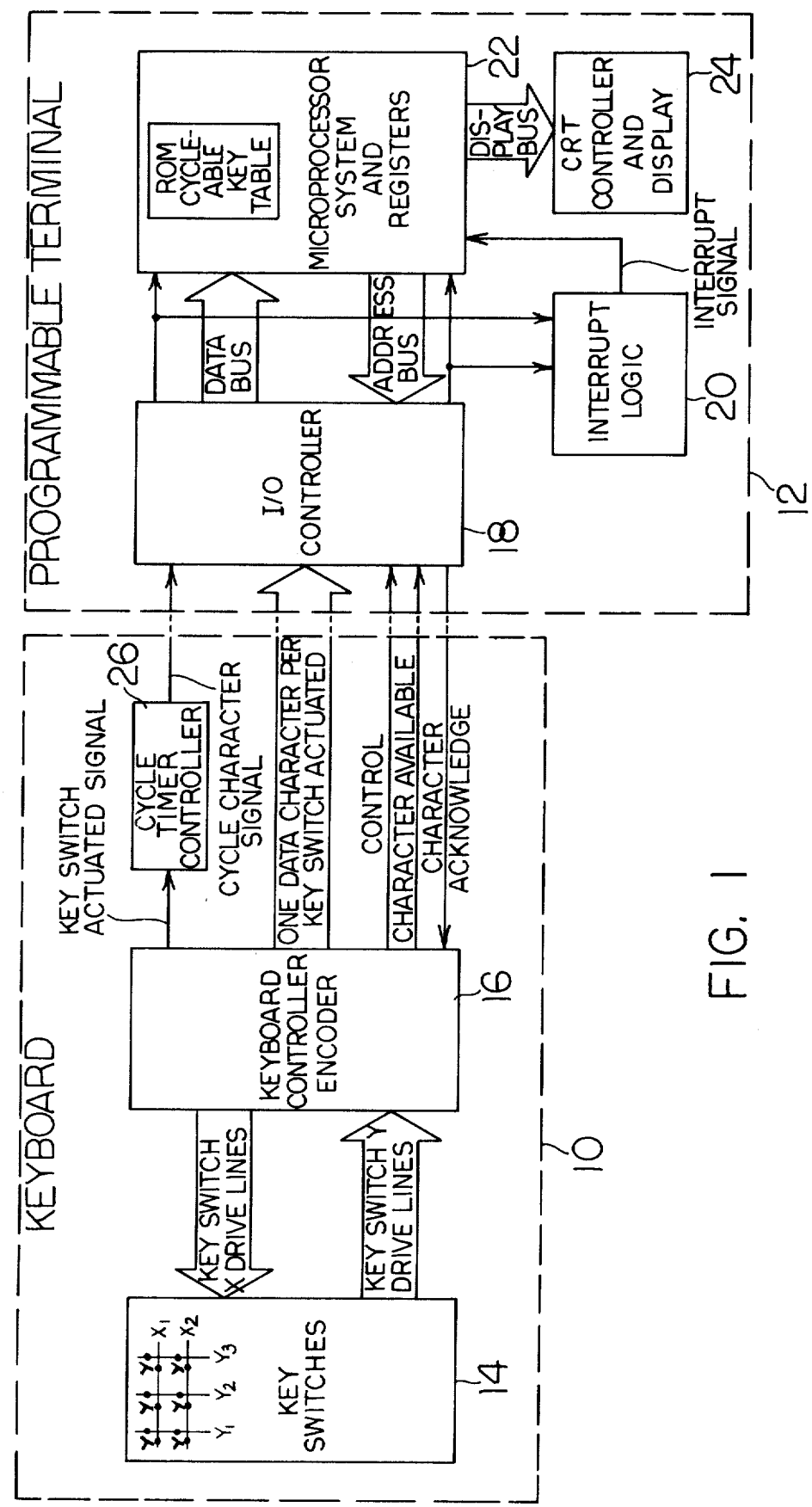
FIG. 1 is a block schematic diagram illustrating the cycle timer controller of the present invention incorporated in a keyboard which is connected to a programmable terminal.

Since the present invention resides primarily in the novel incorporation and use of the cycle timer controller in the keyboard for the purpose summarized above, and not in the specific detailed structures of the keyboard, terminal or cycle timer controller, per se, the structures, control and arrangement of these individually well-known circuits and devices are illustrated in the drawing by use of readily understandable block representations, which show only the specific details pertinent to the present invention. This is done in order not to obscure the disclosure with structural details which will be readily apparent to those skilled in the art in view of the description herein. Also, various portions of the keyboard and terminal have been appropriately consolidated and simplified to stress those portions pertinent to the present invention.

KEYBOARD AND PROGRAMMABLE TERMINAL—IN GENERAL

Referring now to the drawings, there is shown in FIG. 1, in outline form, a keyboard 10 and a programmable terminal 12 connected to the keyboard 10. The keyboard 10 includes a plurality of key switches 14, each of which when actuated upon being depressed causes connection to occur between a specific pair of X and Y drive lines in a matrix thereof. The X-Y drive line matrix, shown in fragmentary form in FIG. 1, is coupled to a keyboard controller encoder 16 which sequentially energizes the X drive lines and receives back a signal from one of the Y drive lines when a key switch is depressed. The encoder 16 generates a specific combination of signals in parallel fashion (i.e., seven data bits and one alpha shift bit) which combination comprises specific DATA CHARACTER signals corresponding to the specific pair of X-Y drive lines connected by depression of the one key switch. Also, simultaneously, CONTROL and CHARACTER AVAILABLE signals are generated.

The programmable terminal 12 includes an I/O controller 18, interrupt logic 20, microprocessor system and registers 22 and a CRT controller and display 24. The DATA CHARACTER, CONTROL and CHARACTER AVAILABLE signals, generated by the keyboard decoder 16 upon depression of one of the key switches, are received by the I/O controller 18 of the terminal 12. In response to receipt of these signals, the I/O controller 18 generates and couples a CHARACTER ACKNOWLEDGE signal to the keyboard controller encoder 16 and also generated a signal that is coupled to the microprocessor 22 and the interrupt logic 20. The interrupt logic 20, in turn, sends an INTERRUPT signal to the microprocessor 22. The signal from the I/O controller 18 and the INTERRUPT signal from the interrupt logic 20 cause the microprocessor 22 to generate appropriate signals on the address bus for interrogating the I/O controller 18. Upon interrogation, the DATA CHARACTER signals are sent on the data bus from the I/O controller 18 to the microprocessor 22 for processing. Among various possible actions on the DATA CHARACTER signals taken by the microprocessor 22, one may be to generate appropriate signals on the display bus for causing the CRT controller and display 24 to cause display of the specific character, associated with the depressed key switch, at a specific location on its screen.

Heretofore, with prior art keyboards, if it were desired to cause repetitive display or "cycling" of the character across the screen, either the keyboard was provided with a separate "cycle" key switch that had to be depressed along with the one particular key switch which the operator intended to cycle, or the keyboard was specifically designed to make certain of the key switches cyclable. Thus, on the one hand, so long as the operator held the cycle key switch and the one particular key switch in their depressed positions, or, on the other hand, so long as the operator held a particular cyclable key switch depressed, its character would be cycled across the display screen. Furthermore, the cycle rate was determined by the keyboard. The disadvantages associated with both of these prior art approaches have been pointed out above. The improvement provided by the present invention, which obviates these disadvantages of the prior art keyboard designs, will now be described.

CYCLE TIMER CONTROLLER

The improvement provided by the present invention relates to the incorporation of a cycle timer controller, generally designated 26, into the keyboard 10. The cycle timer controller 26 interfaces between the keyboard controller encoder 16 and the I/O controller 18 so as to render all key switches 14 of the keyboard 10 potentially cyclable. Whenever one of the key switches 14 is actuated (depressed), the keyboard controller encoder 16 generates, in addition to the signals mentioned above, a high KEY SWITCH ACTUATED signal which is received by the cycle timer controller 26. After the lapse of a predetermined period of time, for example 500 milliseconds, and if the key switch 14 is still depressed, the cycle timer controller 26 generates a high CYCLE CHARACTER signal which is received by the I/O controller 18 of the terminal 12. Upon receipt of this signal, the I/O controller 18 generates a signal which is received by the microprocessor 22 and the interrupt logic 20. The interrupt logic 20, in turn, sends an INTERRUPT signal to the microprocessor 22. The signal from the I/O controller 18 and the INTERRUPT signal from the interrupt logic 20 cause the microprocessor 22 to interrogate the recycle code of the cyclable key table that is stored in its ROM. If the particular depressed key switch has been programmed in its ROM to be a cyclable key, then the microprocessor causes the character to be cycled across the display screen at a rate controlled by the microprocessor 22. Once the depressed one of the key switches 14 is released or another key switch is depressed, the cycling of the character is terminated.

It is therefore seen that the cycle timer controller 26 does not control the rate at which the cycled character will be displayed across the terminal display, but only determines whether a key switch has been held in a depressed position (actuated) long enough to initiate a cycling operation by the microprocessor 22 of the terminal 12. Furthermore, the microprocessor 22 determines whether or not a particular key switch is actually cyclable. From the point of view of the keyboard, all of its keys are cyclable, but whether or not this capability is utilized depends upon the particular terminal used with the keyboard. Also, the display cycle rate is determined solely by the terminal 12.

Figure 2:
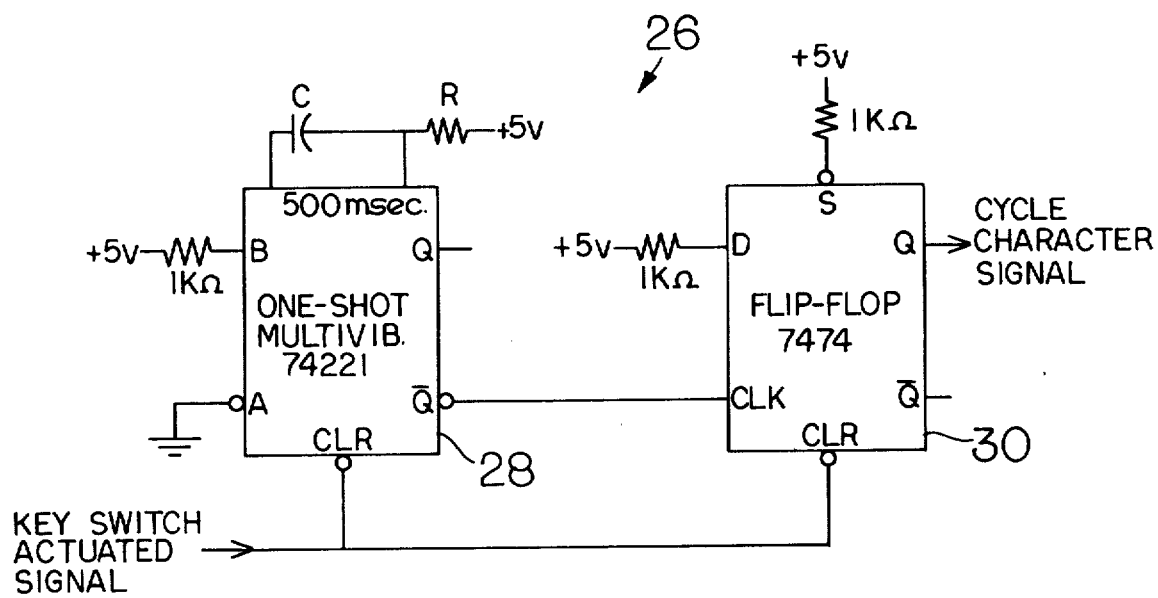
FIG. 2 is an exemplary embodiment of the cycle timer controller of FIG. 1.

An exemplary embodiment of the cycle timer controller 26, shown in FIG. 2, incudes a one-shot monostable multivibrator 28 and a flip-flop 30. Other suitable means for carrying out the functions performed by the multivibrator and flip-flop, as hereinafter described, are considered to be within the purview of the present invention and would be apparent to one skilled in the art. The operation of the embodiment of the cycle timer controller 26 of FIG. 2 will now be described in reference to the timing diagram of FIG. 3 and the function table set forth in FIG. 4. In the following discussion, it will be assumed that a first key switch is depressed (actuated) and held there, but before the predetermined time period required to raise the CYCLE CHARACTER signal has passed, a second key switch is depressed (actuated) and held there for more than the predetermined period.

Figure 3:
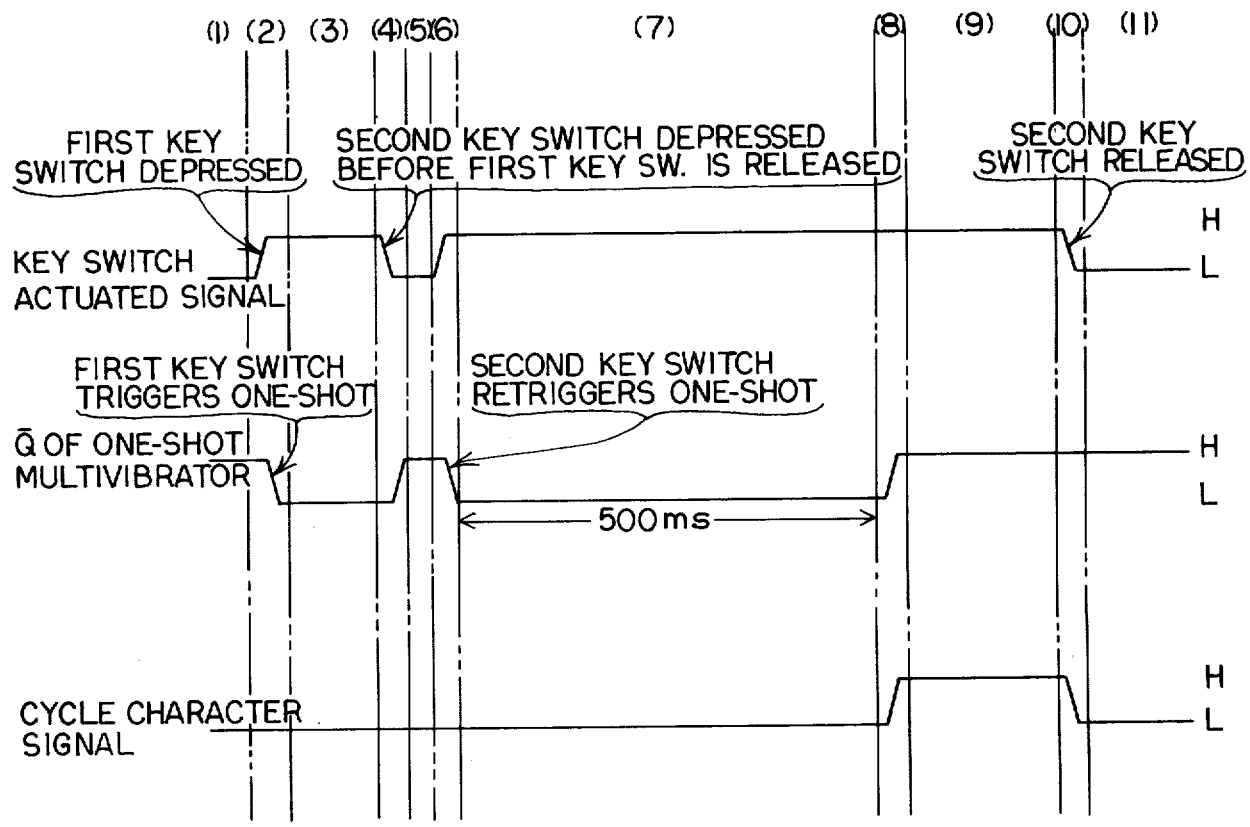
FIG. 3 is a timing diagram of the signals and states generated at various inputs and outputs of the components comprising the embodiment of the cycle timer controller of FIG. 2 when initially a first key switch is depressed followed by depression of a second key switch before the first key switch is released.

The initial condition of the cycle timer controller 26 before actuation of any of the key switches 14 is depicted in interval (1) of FIGS. 3 and 4. The KEY SWITCH ACTUATED signal is low which holds the CLR inputs of the one-shot multivibrator 28 and flip-flop 30 in low states. With their CLR inputs thus enabled, the $\overline{Q}$ output of the one-shot multivibrator 28 is forced to a high state, while the Q output of the flip-flop 30 is forced to a low state. Therefore, the CYCLE CHARACTER signal from the cycle timer controller flip-flop 30 to the I/O controller 18 is low and, thereby, does not prompt any response by the controller 18 to it.

During interval (2), as seen in FIGS. 3 and 4, a first key switch is depressed (actuated), causing a positive, low-to-high transition to occur in the KEY SWITCH ACTUATED signal which disables the CLR inputs of the one-shot multivibrator 28 and flip-flop 30. When the signal level on the CLR input of the multivibrator 28 reaches a high state, the high B input of the multivibrator 28 causes its Q output to make a positive transition and its $\overline{Q}$ output a negative transition. The latter transition also occurs at the CLK clock input of the flip-flop 30. However, since the high state on the D input of the flip-flop 30 is only transferred to its Q output on the occurrence of a positive transition at its CLK input, the Q output remains unchanged (stays low).

However, the positive transition on the CLR input of the multivibrator 28 triggers the same to run such that its $\overline{Q}$ output will now remain low for a predetermined period of time, so long as its CLR input remains high, as determined by the values of capacitor C and resistor R connected to the multivibrator 28. The values of the capacitor and resistor may be chosen using a known equation to cause, as an example, the lapse of a 500 millisecond period of time before the $\overline{Q}$ output returns to a high state. Thus, if the keyboard operator depresses a key switch and holds it in the depressed position for more than one-half of a second, it is assumed that the intention of the operator is to cause the character associated with that particular key switch to be cycled on the screen of the terminal display 24. In other words, the period of time that must lapse before the character will be cycled will be preset through selection of appropriate capacitor and resistor values so as to be much longer than the small amount of time consumed by a normal keystroking operation where there is no intention to cause cycling of a character.

Interval (3) of FIGS. 3 and 4 depicts the status of the various signal levels on the inputs and outputs of the multivibrator 28 and flip-flop 30 during an initial portion of the predetermined time period when the multivibrator 28 is running after the first key switch is actuated (depressed) and maintained in that state.

However, during interval (4) a second key switch is actuated (depressed) even though the first key switch is still held in the depressed position. This situation might often occur during normal keystroking operations. Depression of the second key switch, because of conventional N-key-rollover design of the keyboard encoder 16, terminates sending of the character code signals of the first key switch. Also, the KEY SWITCH ACTUATED signal momentarily goes low reflecting the termination of generation of the first key switch character code and the initiation of generation of the second key switch character code by the keyboard controller encoder 16. These momentary transitions of the KEY SWITCH ACTUATED signal from a high to low and back to a high state cause the CLR input of the multivibrator 28 to make the same transitions, as shown in successive intervals (4), (5) and (6) of FIGS. 3 and 4.

When the CLR input of the multivibrator 28 reaches the low state, the $\overline{Q}$ output is forced high and running of the one-shot multivibrator is terminated. Following thereafter, when the CLR input of the multivibrator 28 is returned to the high state, such as after 50 nanoseconds, its $\overline{Q}$ output is retriggered to a low state whereby the multivibrator 28 starts running for the predetermined time period again. During the above-described momentary transitions of KEY SWITCH ACTUATED signal, the CLR input of the flip-flop 30 also made the same transitions. Likewise the CLK input of the flip-flop 30 made the same transitions as the $\overline{Q}$ output of the multivibrator 28. However, the negative transition on the CLR input of the flip-flop 30 during interval (4) overrides the positive transition on its CLK input such that the latter cannot cause the Q output of the flip-flop to change to a high state.

In interval (7) the first key switch is released (deactuated). However, this action has no effect on the cycle timer controller 26. The second key switch is maintained in its actuated state (depressed position) for the duration of the predetermined time period of 500 milliseconds.

During interval (8), the end of the time period of running of the multivibrator 28 from its retriggered position by the depression of the second key switch is reached; and its $\overline{Q}$ output makes a positive transition to a high state. Concurrently, a positive transition occurs on the CLK input of the flip-flop 30. Now, since the CLR input of the flip-flop 30 is disabled, the high state of the flip-flop's D input is transferred to its Q output. Thus, the CYCLE CHARACTER signal, i.e., the Q output of the flip-flop 30, is raised to a high state, which initiates the actions previously described to occur in the terminal 12 and results in the character associated with the second key switch to be cycled on the screen of the terminal display 24 if the character is one of those which has been programmed as cyclable in the look-up table resident in the ROM of the terminal's microprocessor 22.

During interval (9), the CYCLE CHARACTER signal stays high since the KEY SWITCH ACTUATED signal remains high due to the second key switch being held in the depressed (actuated) position by the keyboard operator.

In interval (10), the second key switch is released (deactuated), returning the KEY SWITCH ACTUATED signal to a low state which enables the CLR input of the flip-flop 30 and forces its Q output low. Thus, the CYCLE CHARACTER signal goes low and cycling of the character associated with the second key switch is terminated by the terminal 12. The CLR input of the multivibrator 28 is also enabled (goes low); however, its Q and $\overline{Q}$ outputs are already at their stable states, respectively low and high. The respective states of the inputs and outputs of the multivibrator 28 and flip-flop 30 are the same in interval (11) as described above for interval (1).

Figure 5:
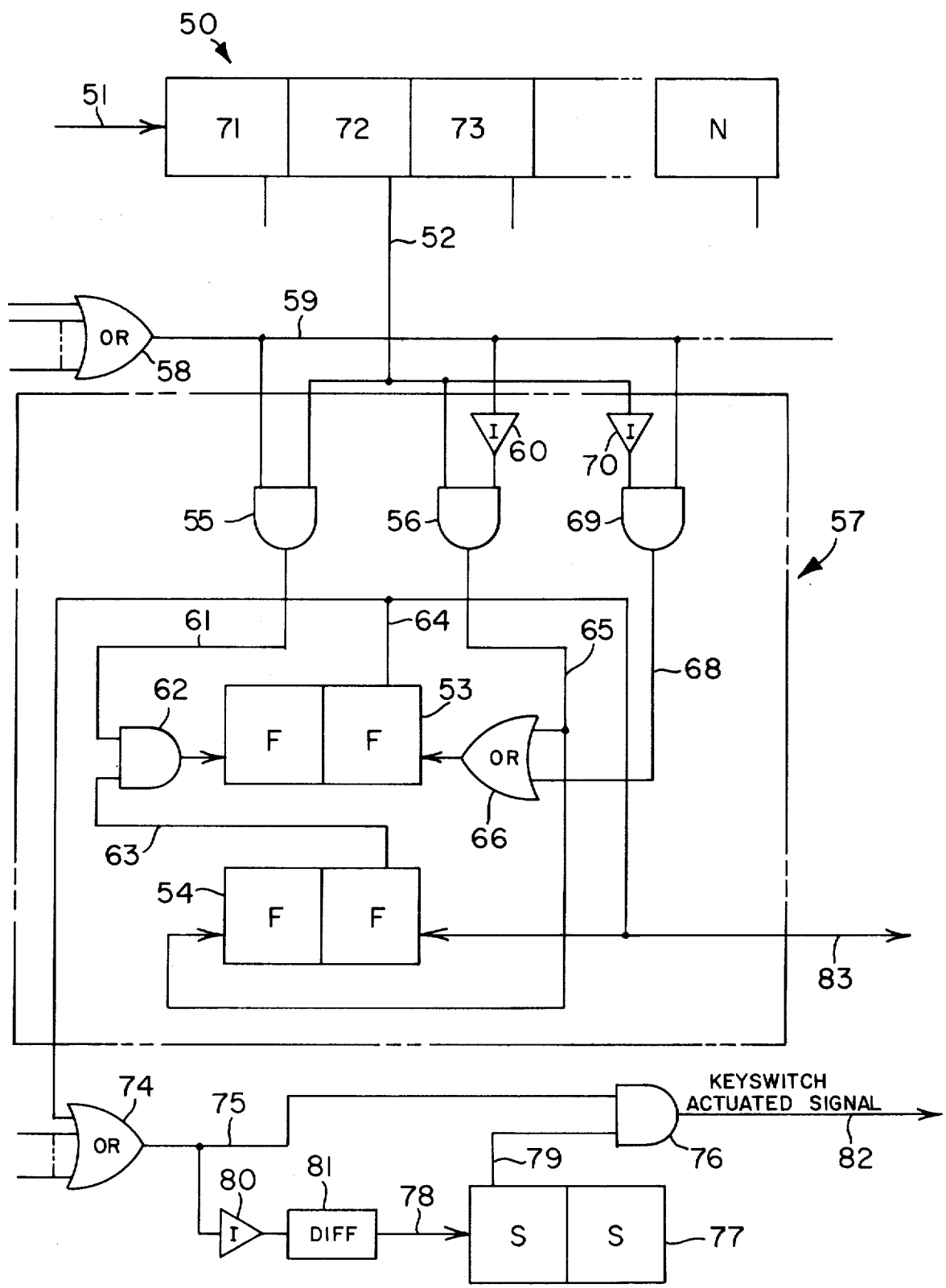
FIG. 5 is a block schematic diagram illustrating exemplary logic circuitry for producing the key switch actuated signal of FIG. 2.

Referring now specifically to FIG. 5, an example of one circuit arrangement for generating the KEY SWITCH ACTUATED signal is shown. This circuit is shown in logical schematic form using well known circuit elements and may be a part of the keyboard controller encoder 16.

A stepping register or ring 50 having a stage, 71, 72, 73—N, respectively, corresponding to each of the key switches shown at 14 in FIG. 1 is advanced by signals on line 51 in step with the scanning of the key switches.

Thus, for each key switch scanned, a corresponding stage of ring 50 produces a signal at its output on a line 52. Each stage of ring 50 is connected to a corresponding storage device 57, the details of only one of which are shown. Storage device 57 includes flip-flops 53 and 54 as well as a pair of AND circuits 55 and 56. These components and their associated components may be standard parts and are not shown in detail. An OR circuit 58 is fed by the Y drive lines coming from the key switches as shown in FIG. 1 and operates such that if there is a high signal on any of the Y drive lines a high output will appear at the output of OR circuit 58 on line 59. The output on line 59 is fed to one input of AND circuit 55 and also through an inverter 60 to one input of AND circuit 56. The other input to AND circuit 55 is from the output of stage 72 of ring 50. As ring 50 is advanced to stage 72, a high signal will be applied over a line 52 to the second input of AND circuit 55. This same signal is also applied to the second input of AND circuit 56. AND circuits 55 and 56 operate such that when both inputs are high, a high output is produced. The output of AND circuit 55 is taken over line 61 to one input of an AND circuit 62. The other input of AND circuit 62 is over line 63 from the output of flip-flop 54. The signal on line 63 from flip-flop 54 will be high when flip-flop 54 is in the set condition. Thus, when flip-flop 54 is set and there is a signal appearing at the output of AND circuit 55, flip-flop 53 will be set. When flip-flop 53 is set the output appearing on line 64 is high. Thus, as flip-flop 53 is set the output on line 64 will go high and over this line will reset flip-flop 54 and remove the high signal from one side of AND gate 62. Flip-flop 54 is set by a signal from the output of AND circuit 56 over line 65. AND circuit 56 produces an output when the corresponding stage of ring 50 is activated and when a low signal appears on line 59, is inverted by inverter 60 and is applied to the other input of AND circuit 56. Thus, AND circuit 56 will produce a high output on line 65 when ring 50 advances to stage 72 and when there is no key closure of the corresponding key. OR circuit 58 has a low signal on its output and over line 59 the low signal is inverted at inverter 60 to supply the second high to the input of AND circuit 56 to produce a high signal on line 65 to set flip-flop 54. Flip-flop 53 is reset by this same signal on line 65 through OR circuit 66 and over line 67 to the reset input of flip-flop 53. Flip-flop 53 may also be reset through OR circuit 66 if a high output appears at line 68 from AND circuit 69. A high output will appear on line 68 from AND circuit 69 when no high signal is present from stage 72 of ring 50 and when at the same time there is a high output from OR circuit 58 on line 59. Thus, flip-flop 53 is reset when some other flip-flop corresponding to flip-flop 53 is set by depression of a corresponding key. OR circuit 74 has an input for each key switch from its corresponding flip-flops 53. Consequently, there will appear on the output of OR circuit 74 and line 75 a high signal when any flip-flop corresponding to flip-flop 53 is set. The output of OR circuit 74 over line 75 is applied to one input of an AND circuit 76. The other input of AND circuit 76 is derived from a single-shot multivibrator 77 which single-shot multivibrator may be of standard construction and such that when set by a positive-going pulse on its input 78, it will produce a negative-going output at line 79 for a predetermined duration. The duration of the output from single-shot multivibrator 77 is predetermined to correspond to the low portion of the KEY SWITCH ACTU-ATED signal as shown during intervals (4), (5) and (6) in FIG. 4. The input to single-shot multivibrator 77 is the signal on line 75 taken through an inverter 80 and a differentiating circuit 81 to produce the positive-going pulse on line 78. This positive-going pulse is produced as a consequence of a flip-flop corresponding to flip-flop 53 being reset. The conditions under which flip-flop 53 or any of the corresponding flip-flops are reset were reviewed above. As flip-flop 53 is reset, a negative-going edge of a signal will appear on line 75, be inverted at inverter 80 to become a positive-going edge, be differentiated at 81 to become a short positive pulse which is the signal used to set single-shot multivibrator 77. Single-shot multivibrator 77 will remain in its set state until its internal timing network causes it to revert to its initial condition. Thus, during the time that a negative-going or low signal appears on line 79, no signal will appear at the output of AND circuit 76 on line 82. The line 82 is the line carrying the KEY SWITCH ACTUATED signal previously described and shown in FIG. 3. The output from flip-flop 53 and the corresponding flip-flops for other stages of the ring 50 may be taken on a line 83 and encoded as the DATA CHARACTER signal from the keyboard controller encoder 16.

Although the cycle timer controller 26 constituting the improvement provided by the present invention has been described in detail with reference to an exemplary embodiment thereof formed by a one-shot monostable multivibrator and a flip-flop, other versions of the cycle timer controller are within the skill of the art once its functions herein described are made known and thus should be considered within the purview of the present invention.

Having thus described the invention, what is claimed is:

1. A character cycle controller for a CRT display terminal, comprising:
   a plurality of key switches, a separate character associated with each one of said key switches;
   means responsively coupled to said plurality of key switches for generating a Key Switch Actuated signal that is indicative that one of said key switches is being depressed;
   cycle timer controller means responsively coupled to said Key Switch Actuated signal for generating a Cycle Character signal only if said Key Switch Actuated signal is received for a predetermined period;
   memory means for storing a plurality of addressable recycle codes, a recycle code associated with each of said key switches for indicating that the associated key switch is or is not recyclable; and,
   said memory means responsively coupled to said Cycle Character signal for enabling said recycle code to recycle a recyclable character that is associated with a depressed recyclable key switch.

2. A character cycle controller for a CRT display terminal, comprising:
   a plurality of key switches, a separate character associated with each one of said key switches;
   means responsively coupled to said plurality of key switches for generating a Data Character signal that is uniquely associated with each separate one of said key switches and for generating a Key Switch Actuated signal that is indicative that one of said key switches is being depressed;

cycle timer controller means responsively coupled to said Key Switch Actuated signal for generating a Cycle Character signal only if said Key Switch Actuated signal is received for a predetermined period;

memory means for storing a plurality of addressable microcodes, a microcode associated with each of said key switches, each of said microcodes including a recycle code for indicating that the associated key switch is or is not recyclable;

means responsively coupled to said Data Character signal for addressing said memory means and reading out the depressed key switch associated microcode; and means responsively coupled to said Cycle Character signal for enabling said recycle code to recycle or not recycle the character that is associated with said depressed key switch.

3. A character cycle controller for a CRT display terminal, comprising:

a plurality of key switches, a separate character associated with each one of said key switches;

means responsively coupled to said plurality of key switches for generating a Data Character signal that is uniquely associated with each separate one of said key switches and for generating a Key Switch Actuated signal that is indicative that one of said key switches is being depressed;

cycle timer controller means responsively coupled to said Key Switch Actuated signal for generating a Cycle Character signal only if said Key Switch Actuated signal is received for a predetermined period;

memory means for storing a plurality of addressable microcodes, a microcode associated with each of said key switches, each of said microcodes including a recycle code for indicating that the associated key switch is or is not recyclable;

display means for displaying the character that is associated with the depressed key switch;

means responsively coupled to said Data Character signal and said Cycle Character signal for addressing said memory means and reading out the depressed key switch associated microcode; and, means coupling signals, which signals are representative of said readout microcode, from said memory means to said display means for displaying and recycling or not recycling said key switch associated character in response to said recycle code.

* * * * *